Feb. 28, 1928.                                                        1,661,079
                              A. NEFGEN
PRODUCTION OF PARTIAL NEGATIVES OR DIAPOSITIVES FOR MULTICOLOR PRINTING
                        Filed Feb. 27, 1923        2 Sheets-Sheet 1

Fig. 1.

GRAY HALF-TONE IMAGE SHADING FROM DARK TO LIGHT DOWNWARDLY

Fig. 2.

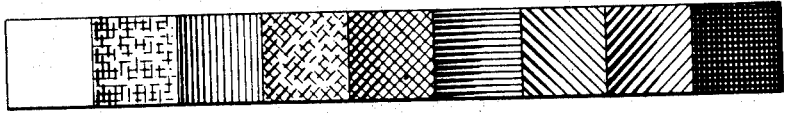

COLORED IMAGE

Fig. 3.

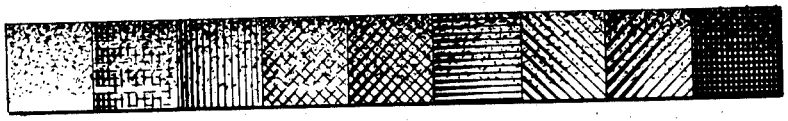

RESULT OF ADDING IMAGES FIGS. 1 AND 2

Fig. 4.

YELLOW PARTIAL NEGATIVE OF FIG. 3 THROUGH VIOLET FILTER

Fig. 5.

RED PARTIAL NEGATIVE OF FIG. 3 THROUGH GREEN FILTER

Fig. 6.

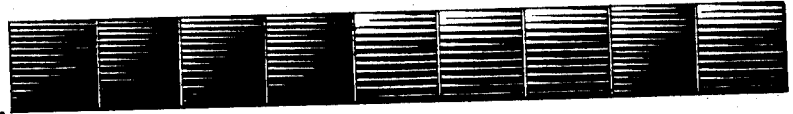

BLUE PARTIAL NEGATIVE OF FIG. 3 THROUGH ORANGE FILTER

Inventor:
A. Nefgen,
By Langner, Parry, Card + Langner
Att'ys.

Feb. 28, 1928.

A. NEFGEN 1,661,079

PRODUCTION OF PARTIAL NEGATIVES OR DIAPOSITIVES FOR MULTICOLOR PRINTING

Filed Feb. 27, 1923   2 Sheets-Sheet 2

*Fig. 7.*

YELLOW DIAPOSITIVE FROM FIG. 4

*Fig. 8.*

RED DIAPOSITIVE FROM FIG. 5

*Fig. 9.*

BLUE DIAPOSITIVE FROM FIG. 6

*Fig. 10.*

RESULTING DUPLICATE OF FIG. 3 BY USING FIG'S. 7, 8 & 9 TOGETHER

*Fig. 11.*

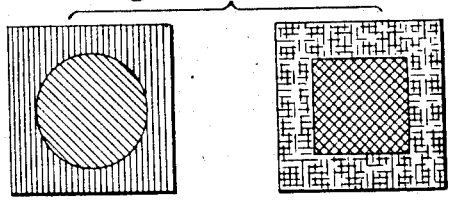

PAIR OF COLORED PRIMARY DIAPOSITIVES

*Fig. 12.*

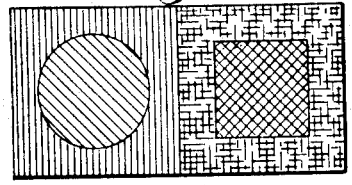

PAIR AS JOINED IN PRINTING FORM

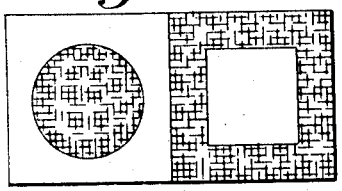   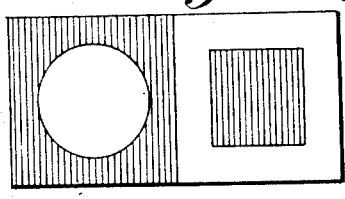

FINAL COLORED DIAPOSITIVES

*Fig. 15.*

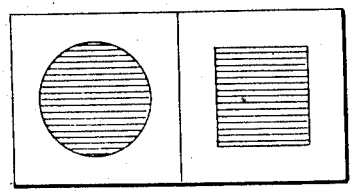

Inventor:
A. Nefgen.
By
Langner, Parry, Card & Langner
Att'ys.

Patented Feb. 28, 1928.

1,661,079

UNITED STATES PATENT OFFICE.

AUGUST NEFGEN, OF GODESBERG, GERMANY.

PRODUCTION OF PARTIAL NEGATIVES OR DIAPOSITIVES FOR MULTICOLOR PRINTING.

Application filed February 27, 1923, Serial No. 621,660, and in Germany March 7, 1922.

This invention relates to the production of partial negatives or diapositives to be used in multi-color printing, and has for its object an improved method for the production of such devices.

Repeated experiments have been made to produce partial plates for multi-color works, not by the method which utilizes objective color selection, that is, photographic selection by the aid of color screens, filters or lenses, but by purely manual means. The present process combines such manual manipulation together with the use of lenses and selection by filter or color screens.

To this end the present method provides for the making of partial plates, not from the original itself, for example, an oil or water color painting, but from a diapositive of the original which has been colored with soluble colors. Said partial plates being made by the usual means of transmitted light, lenses, and color selectors. The process also comprises using and so selecting the colors for forming the diapositive, these said colors may be surely and completely separated out by the color filter. The partial plates thus produced give printing plates directly, which without further manipulation are suitable for color reproduction.

The process is illustrated in the drawings in which

Figs. 1 to 10 inclusive which show diagrammatic views illustrating the principle of the invention, and Figs. 11 to 15 which show diagrammatic means by which the invention may be carried out.

Referring now in detail to the several figures, Fig. 1 is a gray half tone image.

Fig. 2 shows the coloring to be applied to the half tone image of Fig. 1. In this connection the various colors are indicated by various distinctive types of markings, while the depths of the coloring is indicated by the blackness or thickness of such markings.

Fig. 3 shows the coloring of Fig. 2 applied to the gray half tone of Fig. 1 and illustrates how the shading of the gray half tone from dark to light from the top to the bottom as in Figure 1, blends with the coloring of Fig. 2 which is from dark to light from the left to the right, to produce the effect shown in Fig. 3.

Figs. 4, 5, and 6 show the results obtained when Fig. 3 is photographed under the violet, green and orange color filters to produce the three partial negatives of Figs. 4, 5 and 6 which are respectively, yellow, red and blue. In Figs. 4, 5 and 6 the colors, yellow, red and blue are indicated by the characteristic markings, while the depths of color is indicated by the shade of the lines used.

Figs. 7, 8 and 9 illustrate the diapositives obtained respectively from the negatives of Figures 4, 5 and 6 and are themselves, respectively, yellow, red and blue.

The result obtained by using the partial diapositives 7, 8 and 9 for forming partial printing plates and printing the same, is illustrated in Fig. 10 which is, as of course it should be, an exact duplicate of Fig. 3 referred to above and shows the combined effect of the gray half tone of Fig. 1 with the colored half tone of Fig. 2.

The combination of the gray half tone with the half tone colors, gives the following color separations as read from left to right and with reference to Figs. 4-6 or Figs. 7-9.

|         | Yellow            | Red               | Blue                |
|---------|-------------------|-------------------|---------------------|
| White   | End of gray image | End of gray image | End of gray image.  |
| Yellow  | Full              |                   | End of gray image.  |
|         |                   | End of gray image |                     |
| Red     | End of gray image | Full              | End of gray image.  |
| Orange  | Full              | Full              | End of gray image.  |
| Violet  | End of gray image | Full              | Full.               |
| Blue    | End of gray image | End of gray image | Full.               |
| Green   | Full              | End of gray image | Full.               |
| Brown   | Full              | Full              | Half strength.      |
| Black   | Full              | Full              | Full.               |

Fig. 11 shows a pair of primary diapositives suitably colored with soluble colors, Fig. 12 showing the same diapositives united into one single printing form.

Figs. 13, 14 and 15 show three different colored final diapositives as ready for printing.

If it be desired to make color prints, not from colored originals but from monochromatic originals, the above described method of operation can also be used for this purpose without being subjected to other manipulation steps, it being merely necessary that the diapositive of the monochromatic original be colored in the desired colors.

The invention is one of the greatest importance, particularly in newspaper work where it is required to produce a series of colored reproductions from a common printing form. Formerly, for instance, if a form with twenty pictures were to be printed in three or four colors, 60 or 80 partial plates had to be mounted on three or four mounting or base plates. Obviously this work required not only a great deal of time but involved considerable expense and could not be done with the required accuracy.

It is one of the purposes of this invention to overcome and obviate the difficulties pointed out above.

All of the diapositives colored with the colors, as set forth above, in the form and arrangement in which they are to appear on the printing sheet, are, in the present invention, mounted on a common glass disc and the partial negative or diapositive is produced from this negative mounting. The thus assembled partial pictures make any other mounting unnecessary and obviously have the most accurate and required relation to each other.

By the process of the present invention it is possible to produce at a low cost and on a manufacturing scale, partial negatives or diapositives for multi-color printing which are particularly useful in newspaper printing and at the same time avoiding the various difficulties and excessive cost of previously known methods.

The invention as herein described and the method of operation are clearly set forth in the following claims.

What I claim is:

1. Process for the production of partial negatives or partial diapositives for multi-color printing characterized in that the production of the partial plates is carried out not from an original but from a diapositive of the original which has been colored or painted with all the basic soluble colors.

2. Process for the production of partial negatives or partial diapositives according to claim 1 characterized in that the colors used for coloring the diapositives are selected so that they may be accurately separated out by the color screens.

3. Process for the production of partial diapositives for multi-colored printing of a plurality of originals characterized in that the diapositives, each colored with all the basic soluble colors, are mounted in the proper position in a common printing form and this form used for the production of the final diapositives in the original separate colors.

4. Process for the production of partial negatives or partial diapositives for multi-color printing, comprising, making a diapositive of the original, then coloring such diapositive with all of the basic soluble colors, and then producing the partial plates from the thus colored diapositives for use in multi-colored printing.

In testimony whereof I have signed my name to this specification.

AUGUST NEFGEN.